United States Patent [19]

Rees

[11] Patent Number: 4,527,767

[45] Date of Patent: Jul. 9, 1985

[54] SEAT ADJUSTER

[75] Inventor: Richard W. A. Rees, West Bloomfield, Mich.

[73] Assignee: General Motors Corporation, Detroit, Mich.

[21] Appl. No.: 539,274

[22] Filed: Oct. 5, 1983

[51] Int. Cl.³ .............................................. F16M 13/00
[52] U.S. Cl. ..................................... 248/419; 248/429
[58] Field of Search ............... 248/429, 430, 424, 396, 248/371, 419, 420; 308/3 R, 3.6, DIG. 7; 312/332

[56] References Cited

U.S. PATENT DOCUMENTS

| | | | |
|---|---|---|---|
| 3,022,975 | 2/1962 | Horton et al. | 248/420 |
| 3,240,464 | 3/1966 | Pickles | 248/419 |
| 3,313,512 | 4/1967 | Colautti et al. | 248/419 |
| 3,314,637 | 4/1967 | Fudala | 248/419 |
| 3,321,253 | 5/1967 | Everburg | 312/332 X |
| 4,088,378 | 5/1978 | Pallant et al. | 248/429 |
| 4,238,099 | 12/1980 | Hunwicks | 248/430 |

FOREIGN PATENT DOCUMENTS 3221959 12/1983 Fed. Rep. of Germany .
475554 11/1937 United Kingdom ............... 248/429

Primary Examiner—William H. Schultz
Assistant Examiner—David Purol
Attorney, Agent, or Firm—Herbert Furman

[57] ABSTRACT

A seat slide structure which includes upper and lower tracks, each formed of a pair of complementary opposite hand track members. The track members of the upper track interfit with the track members of the lower track and are normally interengaged therewith through a plastic spacer between the tracks. Occupancy of a seat supported by the slide structure compresses the spacer to release the upper track for movement relative to the lower track. The upper track is driven relative to the lower track by means of a gear housed between the members thereof and engageable with gear teeth of the spacer. Screwjack mechanisms are housed between the members of the upper track to support a seat thereon for vertical adjustment. The upper track members also support a gear mechanism to adjust the inclination of a seat back supported on the upper track.

7 Claims, 12 Drawing Figures

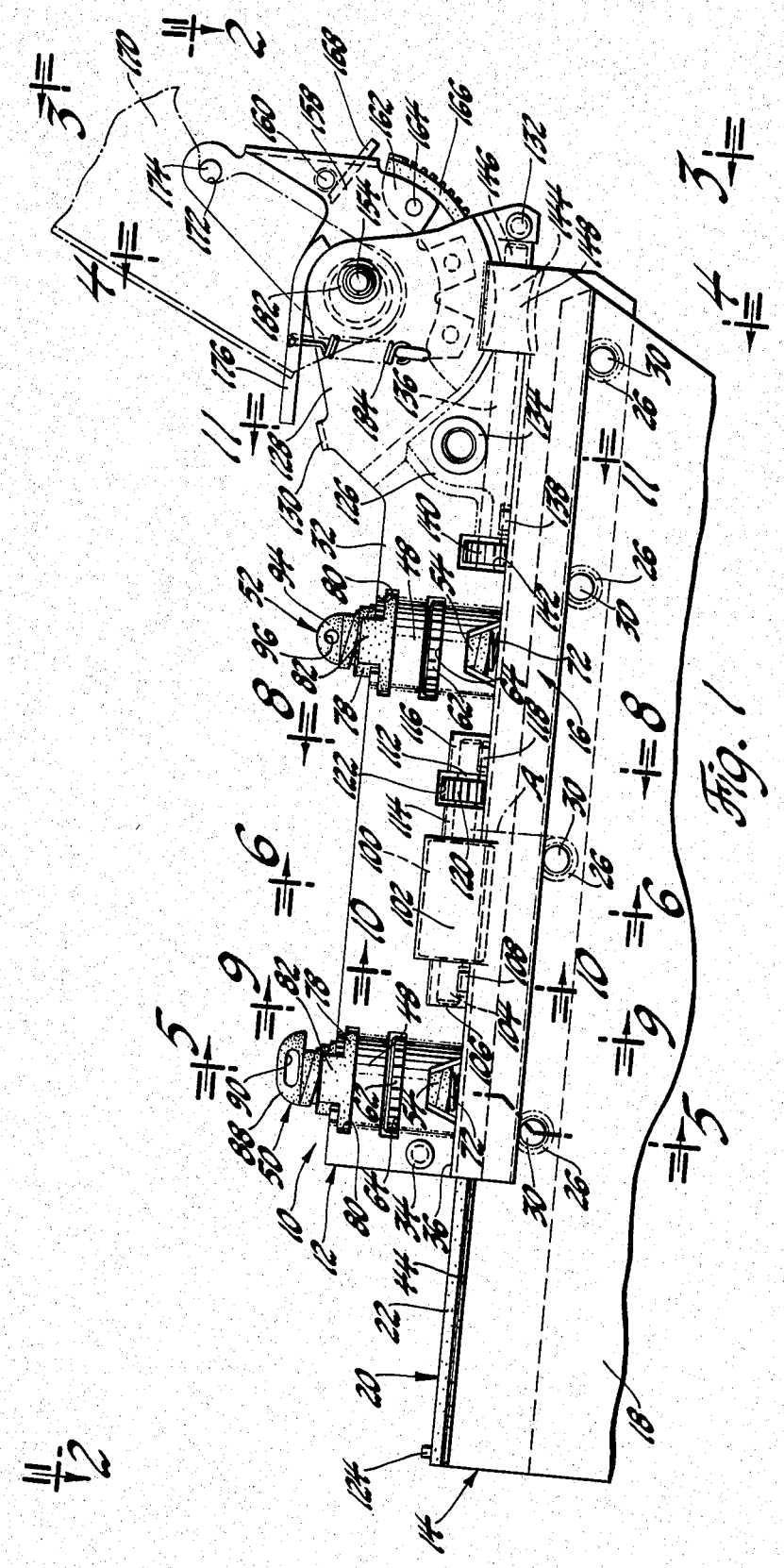

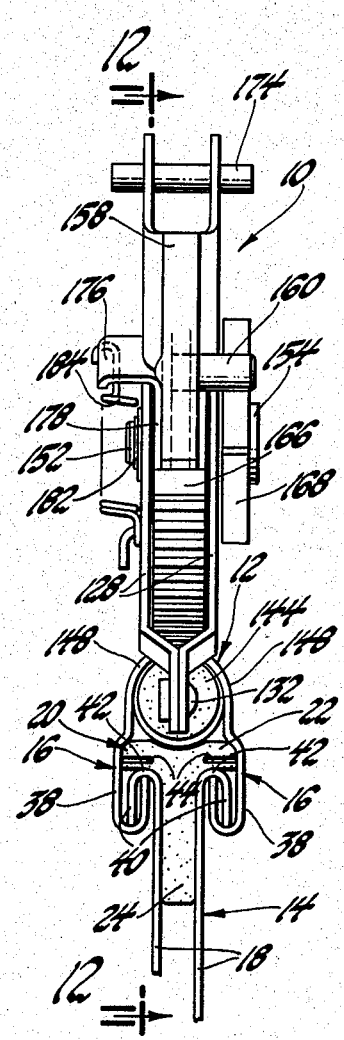
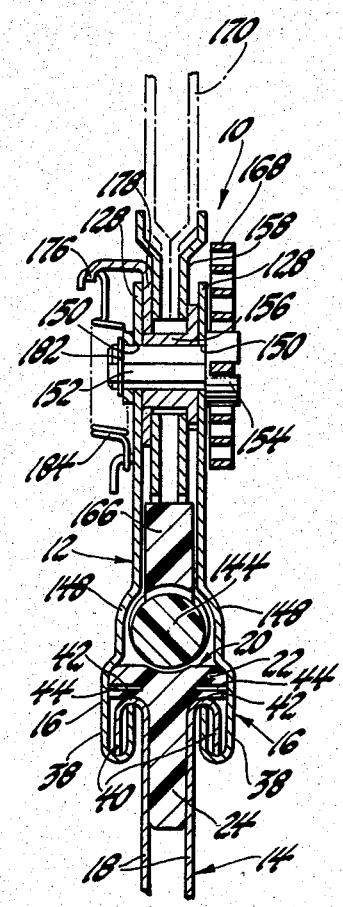
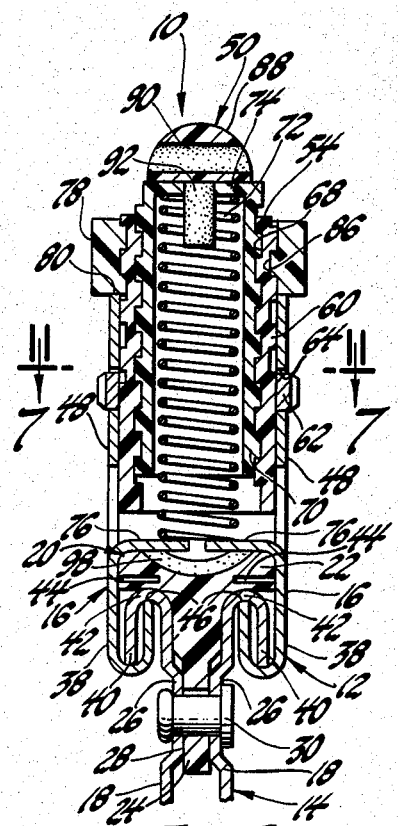
Fig. 3  Fig. 4  Fig. 5
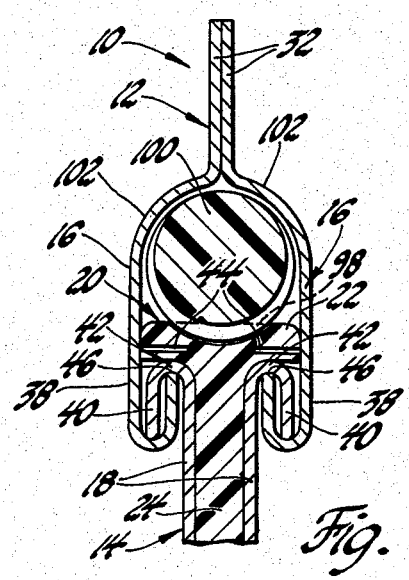
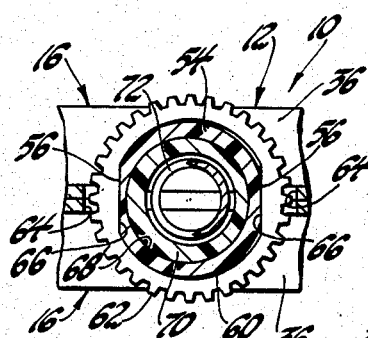
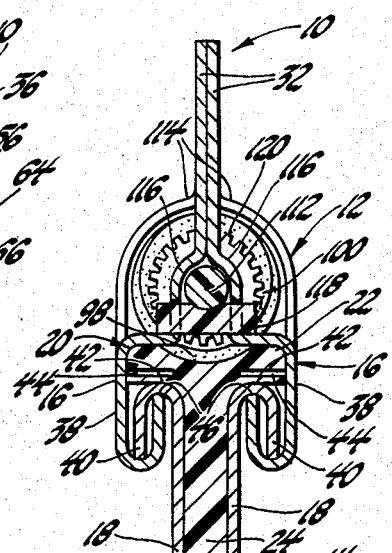
Fig. 6  Fig. 7  Fig. 8

SEAT ADJUSTER

This invention relates generally to seat adjusters and more particularly to vehicle body seat adjusters of the type which provide adjustment of the seat in horizontal directions, selective adjustment of the front or rear portion of the seat, and selective adjustment of the seat back to various reclined positions.

Seat adjusters of this type are known in the prior art. However, the seat adjuster of this invention has several distinct features not found in such prior art seat adjusters. One of the features is that the adjuster includes upper and lower seat tracks which are generally of two piece construction and have reversely bent interfitting flanges. Each track includes inboard and outboard generally complementary track members secured to each other to provide the tracks. Another feature is that the tracks are spaced by a plastic spacer and rack member which permits relative horizontal movement between the tracks only when the seat is occupied. The plastic member is of generally T-shaped cross-section and includes a head portion and a tail portion. The head portion supports the upper track on the lower track and either spaces the interfitting flanges of the tracks or permits such flanges to engage. The head portion is longitudinally slotted to set the spacing between the interfitting flanges of the upper and lower tracks in accordance with seat occupancy. When the seat is unoccupied the slots are open and the interfitting flanges are engaged to provide an anti-rattle feature. When the seat is occupied, the slots are closed to disengage the interfitting flanges and provide for ease of movement of the upper track for horizontal adjustment. The tail portion is located between and secured to the lower track members. A further feature is that the upper track houses a driven gear which is engageable with rack teeth on the head portion of the spacer and rack member to longitudinally drive the upper track and such gear as a unit relative to the lower track and spacer upon rotation of the gear. Yet another feature is that the upper track mounts front and rear vertically telescoping jackscrews which are connected to corresponding portions of the seat for selective vertical adjustment thereof. Each jackscrew includes an outer member threadably and rotatably supported by the upper track and an inner member which is threadable internally of the outer member and secured to a respective front or rear portion of the seat support to vertically adjust such respective portion upon telescopic movement of the jackscrew relative to the upper track. Still another feature is that the inner jackscrew member is hollow and assist springs fitted between such member and the upper track assist upward vertical adjustment of a respective portion of the seat. Still a further feature is that the seat back support bracket is pivotally mounted to the upper track and gear driven between upright and reclined positions. Yet a further feature is that the support bracket pivot includes an eccentric pivot arrangement which is manually rotatable to release the gear drive of the support bracket and provide for instantaneous recline of the seat back bracket and seat back relative to the upper track.

These and other features will be readily apparent from the following specification and drawings wherein:

FIG. 1 is a side elevational view of a seat adjuster according to this invention with the seat, not shown, being unoccupied and the adjuster in its rearmost horizontal position and, vertically down position, and with the seat back in a generally upright position.

FIG. 2 is a plan view of the adjuster taken on line 2—2 of FIG. 1.

FIG. 3 is an enlarged rear elevational view taken on line 3—3 of FIG. 1.

FIG. 4 is an enlarged view along line 4—4 of FIG. 1.

FIG. 5 is an enlarged sectional view along line 5—5 of FIG. 1

FIG. 6 is an enlarged sectional view along line 6—6 of FIG. 1.

FIG. 7 is a sectional view taken along line 7—7 of FIG. 5.

FIG. 8 is an enlarged sectional view along line 8—8 of FIG. 1.

Figure 9:
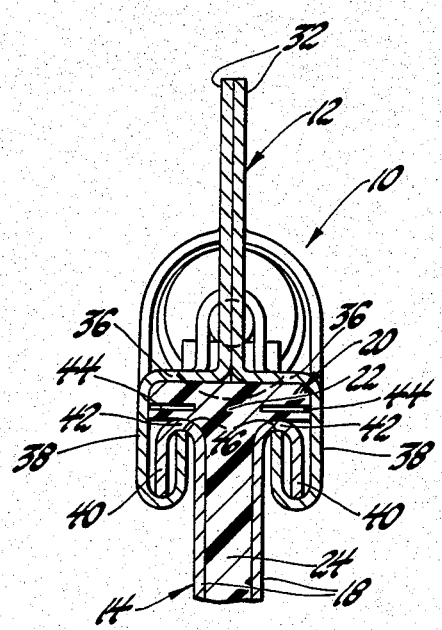
FIG. 9 is an enlarged sectional view taken along line 9—9 of FIG. 1.
Figure 10:
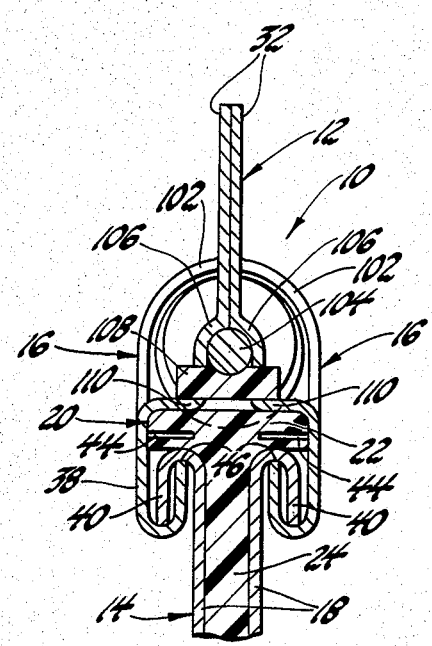
FIG. 10 is an enlarged sectional view taken along line 10—10 of FIG. 1.
Figure 11:
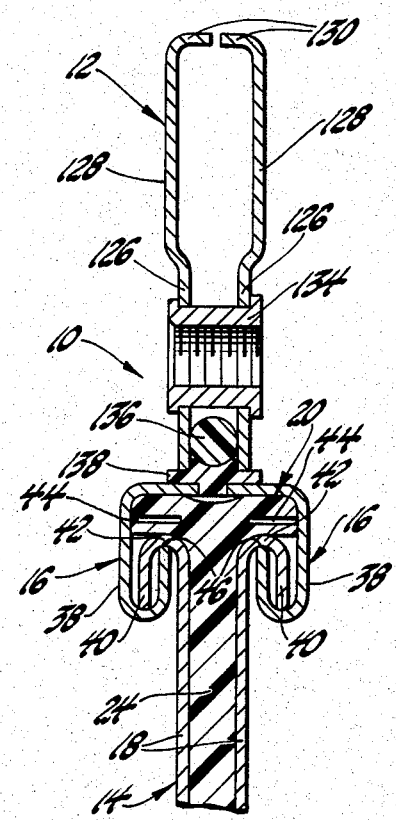
FIG. 11 is an enlarged sectional view taken along line 11—11 of FIG. 1.

Referring now particularly to FIG. 1 of the drawings, a seat adjuster designated generally 10 according to this invention includes an upper track 12 and a lower track 14. As shown in FIGS. 2 through 10, the upper track 12 includes inboard and outboard track members 16, of steel or aluminum, which are the same although of different hand, and the lower track 14 likewise includes inboard and outboard track members 18, of steel or aluminum, which are also the same although of different hand. The adjuster shown is an outboard adjuster and it will be understood that a like inboard adjuster is also provided, with both adjusters extending longitudinally relative to the body to support a vehicle seat, not shown.

A generally T-shaped rack and spacer 20 of plastic material, FIGS. 3 through 6 and 8 through 11, includes a head portion 22 and a tail portion 24. The rack and spacer extends for the full length of the upper and lower tracks. The tail portion 24 fits between and spaces the generally planar webs of the members 18 of the lower track. At a sequential series of four locations, FIGS. 1 and 5, the members 18 are recessed at 26 and the tail portion 24 is recessed at 28, with the recesses being apertured and connected by a rivet 30 to assemble the members 18 and spacer 20 to each other.

The members 16 include generally planar webs 32 which abut each other for the majority of their longitudinal extent and are riveted to each other at 34 to assemble the upper track 12. Each member 16 includes a lateral flange 36, FIG. 9, which cooperatively provide the upper or base wall of the upper track 12. Each flange 36 includes a downwardly or laterally extending reversely bent leg 38 which interfits with a corresponding reversely bent leg 40 of a member 18 of the lower track 14. The head portion 22 of the member 20 seats against the flanges 36 of the upper track and also against the bights 42 of the legs 40 to slidably support the upper track 12 on the lower track 14. The head portion 22 is provided with a pair of continuous longitudinally extending slots 44 which extend inwardly past a respective bight 42 and provide flexibility to the head portion.

When the seat is unoccupied, as shown, the slots 44 are open and the free ends 46 of the legs 38 engage the bights 42 of legs 40 to provide an antirattle feature and ensure that no relative movement of the tracks 12 and 14 can occur. When an occupant is seated on the seat, not shown, the track 12 is moved slightly vertically downwardly relative to the track 14 as slots 44 close. This disengages the free ends 46 of the legs 38 from the bights 42 and permit a smooth and easy movement of the upper track 12 relative to the lower track 14 during horizontal adjustment of the seat.

The track members 16 include integral semi-cylindrical embossments 48 which open to each other and provide housings for front and rear jackscrew devices 50 and 52, FIGS. 1, 2, 5 and 7. These devices are connected, as will be described, to respective front and rear portions of a vehicle seat, not shown, to provide for selective vertical adjustment of such portions of the seat. The jackscrew devices are generally the same, unless otherwise noted, and therefore like numerals will be used for like parts. The jackscrew device 50, includes an outer tubular member 54 of plastic material which is rotatably housed within the cylindrical housing of track 12 provided by embossments 48. The member 54 includes a diametrically opposite pair of external flats 56, FIG. 7, which extend longitudinally thereof and traverse a partial integral high lead external thread 60. A driven gear 62 is rotatably supported in slots 64 provided in each of the embossments 48 and includes a generally double D-shaped bore 66 which slidably and non-rotatably receives the outer member therethrough to operatively couple the gear to the outer member 54. The outer periphery of the gear 62 is toothed as shown in FIGS. 5 and 7 for driving operative engagement with a drive gear which is suitably manually or power driven.

The member 54 is provided with an internal high lead integral thread 68 which threadedly receives a like externally threaded hollow tubular inner member 70 to telescopically interconnect the members 54 and 70. A compression spring 72 seats between the upper end wall 74 of the member 70 and inwardly lanced tabs 76 of the members 16 to thereby continually bias the member 70 upwardly and outwardly relative to the member 54 and provide an assist to vertical upward movement of the front portion of the seat as will be described. The jackscrew 52 may contain a stronger spring 72 or two such springs, one within the other.

A circular cap 78 of plastic material, FIGS. 1, 2 and 5, fits within slots 80 in the members 16 and includes upwardly extending ribs or lugs 82 which are received within slots 84 of the cylindrical embossments 48 to thereby retain the cap to the upper track and locate the cap 78 against both rotational and axial movement. The cap includes a high lead threaded bore 86 which threadedly receives the high lead external thread 60 of the outer member 54 of the jackscrew device 50. A closure 88 of plastic material includes an elongated slot 90 therethrough. The closure 88 seats on the upper end wall 74 of the member 70 and includes an integral pair of retaining legs 92 which are inserted through a generally square-shape opening in the wall 74 to secure the closure to the inner member 70. The elongated slot 90 receives a wire or other portion of the vehicle seat, not shown, to secure the front portion of such seat to the jackscrew device 50 as well as hold the member 70 against rotation.

The jackscrew device 52 is the same as the jackscrew device 50 except that the closure 94 thereof includes a circular bore 96 since relative sliding movement between the seat and only one jackscrew device is necessary to accommodate telescopic movement of one jackscrew device while the other is stationary. The closure 94 of the device 52 is secured to the rear portion of the seat, not shown, in the same manner as closure 88.

The jackscrew devices 50 and 52 are respectively secured to the front and rear portions of the vehicle seat as previously mentioned. Assuming it is desired to vertically upwardly adjust the front portion of the seat the gear 62 of device 50 is rotated to rotate the outer member 54 within the cap 78 and thread member 54 upwardly of track 12. Since the inner member 70 is threaded to the outer member but is held against rotation by being secured to the seat through closure 88, the inner member will thread upwardly of the outer member so that both members telescope relative to each other and vertically upwardly adjust the front portion of the seat. It is believed that downward vertical adjustment of the front portion of the seat and vertical adjustment of the rear portion of the seat are apparent from the foregoing.

It will be noted in FIG. 2 that the head portion 22 of the rack and spacer member 20 is provided with a longitudinal series of rack teeth 98. The teeth 98 extend from the forward end of the member 20 to approximately the dot dash line marked A in FIGS. 1 and 2. The teeth 98 mesh with a gear 100, FIGS. 1, 2 and 6, which is received within an integral housing of the track 12 provided by embossments 102 of each of the members 16. The forward shaft 104 of the gear is received within a pair of integral embossments 106 of the members 16, FIG. 10, and rests on a bearing block 108 which is supported on a pair of inwardly lanced tabs 110 of the members 16. The block 108 includes laterally extending lugs which extend outwardly through the openings resulting from tabs 110 and a pair of longitudinally extending lugs which extend between embossments 106 in order to locate the bearing block with respect to the members 16 of the upper track. The rearward shaft 112 of the gear 100 is housed within spaced pairs of integral embossments 114 and 116 of the member 16 which are the same structure as the embossments 106. Shaft 112 is supported within embossments 116 by a bearing block 118 which is the same as bearing block 108 and is located in the same manner. A driven gear 120 is secured to the shaft 112 and rotates within slots 122 of the members 16. Gear 120 is operatively coupled to any suitable power actuator for rotation of the gear 100.

As shown in FIG. 8, the gear 100 meshes with the rack teeth 98 formed on the upper surface of the member 20. Upon rotation of this gear, it can be seen that the gear and the upper track 12 together with the jackscrew devices 50 and 52 and the seat will move as a unit relative to the member 20 and the lower track 14 to horizontally adjust the seat. The engagement of gear 100 with pin 124 provides a forward stop and the engagement of gear 100 with the untoothed upper portion of the member 20 provides a rearward stop. Pin 124 is removable to permit assembly of tracks 12 and 14 as will be described.

Referring now to FIGS. 1, 2, 11 and 12, the rearward portions of the members 16 include outward offsets 126 and 128. Offsets 128 include lateral tabs 130 which provide stops, as will be described. The members 16 are riveted to each other in abutting relationship at 132. The offsets 126 are connected by an internally threaded bushing 134, FIG. 11, which provides an anchor for a seat belt, such as a retractor or a belt end plate. A shaft 136 is housed between the offsets 126 and has its forward end supported by a bearing block 138 which is the same as the block 108 and is located in the same manner.

The forward end of the shaft 136 is secured to a driven gear 140 which rotates relative to slots 142 of the member 16. The rearward end of the shaft 136 is secured to a worm 144, with the terminal end 146 of the shaft being rotatably supported by semi-circular embossments of offsets 126 and 128. The worm 144 is housed within semi-circular embossments 148 of offsets 126 and 128. Member 20 is grooved to provide clearance for gear 140 and worm 144.

Figure 12:
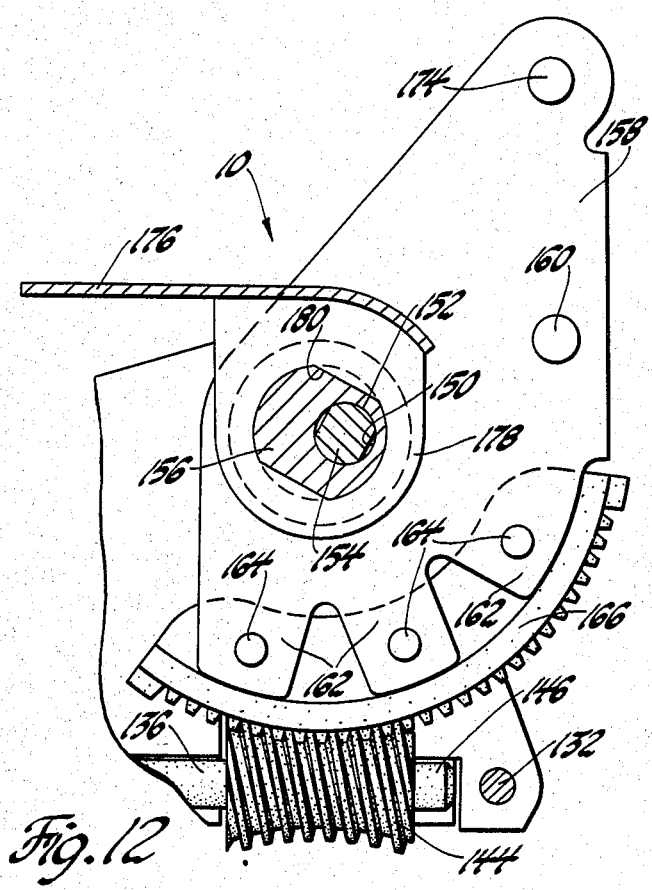
FIG. 12 is a view taken along line 12—12 of FIG. 3.

The offsets 128 are provided with aligned double D shaped openings 150 which receive the like shaped shank 152 of a slot headed pin 154, FIG. 12, in order to couple the pin thereto. A shouldered bushing 156 is eccentrically mounted on the shank 152 of pin 154 between offsets 128, FIG. 4. The exterior of the bushing 156 is of double D shape cross-section, FIG. 12. A U-shaped seat back support bracket 158, having the integral legs thereof connected by a pin 160, is rotatably mounted on bushing 156. The bracket 158 shifts vertically as the bushing 156 rotates eccentrically about the axis of the pin 154. As shown in FIG. 12, the bracket 158 includes three spaced sets of ears 162 which are riveted at 164 to a worm wheel 166 of plastic material. The worm wheel meshes with the worm 144 so as to be driven thereby. A coil torsion spring 168, FIG. 4, surrounds the slotted head of pin 154. The inner coil of the spring is anchored in the slot of the head of the pin and the outer coil of the spring engages the pin 160 to continually bias the bracket 158 counterclockwise as viewed in FIG. 1 about the axis of the bushing 156 and bias the teeth of the worm wheel 166 into engagement with the teeth of the worm 144. There is no allowance for clearance between the teeth of the worm wheel and the worm, the addendum equals the dedendum, so that the worm wheel 166 is forced into maximum contact with the worm 144.

The seat back outboard support arm 170 is shown schematically in FIGS. 1 and 4. This support arm is rotatably mounted on the bushing 156 between the integral legs of the bracket 158. The support arm includes a notch 172 which engages a pin 174 across the legs of the bracket 158 to locate the seat back support arm against rearward pivoting movement about the bushing 156 under gravity bias. Although not shown, a suitable seat back inertia latch is provided between the support arm 170 and the bracket 158. The support arms 170 of the inboard and outboard adjusters support the seat back, not shown, of the seat for forward tilting movement and rearward reclining movement relative to the cushion of the seat.

A manually operable handle 176 has a mounting ear 178, FIG. 12, located between the outboard offset 128 and the outboard integral leg of bracket 158. This ear includes a double D shaped opening 180, FIG. 12, which slidably fits on the exterior of bushing 156 so that the handle is non-rotatively coupled to the bushing. A washer and clip arrangement 182, FIGS. 3 and 4, secures the pin 154 against withdrawal from the offsets 128 of the track members 16 and bushing 156. A tension spring 184 hooked between the handle and a lanced offset tab of the outboard offset 128 biases the handle and bushing 156 as a unit counterclockwise of pin 154. This locates the axis of the bushing counterclockwise of the axis of the pin 154 so that spring 168 rotates the bracket 158 to ensure maximum engagement of the worm wheel 166 with the worm 144.

If it is desired to instantly recline the seat back, not shown, to its maximum reclined position, i.e. rotate the brackets 158 and seat back support arms 170 of the inboard and outboard seat adjusters clockwise of their respective bushings 156, both handles 176 must be simultaneously manually rotated clockwise or lifted up by the seat occupant. This rotates the bushings 156 eccentrically clockwise of pins 154 and moves the worm wheels 166 out of engagement with the worms 144. Since this provides for substantially instanteous reclining of the seat back, it requires that the occupant of the seat use both hands to simultaneously actuate both levers.

The seat back may also be reclined by connecting a suitable actuator manual or power to gear 140. Upon rotation of this gear and worm 144, worm wheel 166 will rotate bracket 158 and support arm 170.

The engagement of the legs of bracket 158 with tabs 130 provides stops for forward tilting and rearward reclining of the seat back.

From the foregoing description it can be seen that many of the components of the seat adjuster are of plastic material for purposes of light weight, strength, and ease of assembly.

The lower track 14 is assembled by locating the members 18 thereof on opposite sides of the rack and spacer member 20 and riveting the parts at 30. Although no mounting provisions for the lower track 14 are shown, any suitable mounting provisions, such as integral flanges on the members 18, brackets secured to such members or otherwise, may be used to mount the adjuster 10 on a vehicle.

The upper track 12 may be assembled by first assembling to the inboard track member 16 the jackscrews 50 and 52; the various gears such as 100 and 102; bearing blocks; pin 154; bushing 156; bracket 158; arm 170; and handle 176, and thereafter assembling the outboard track member 16 to the inboard track member at 34 and 132. Certain components such as the springs 168 and 184 are added during assembly.

The upper and lower tracks can thereafter be slidably assembled and the pin 124 put in place.

The seat adjuster of this invention will carry seat belt loads and thus either a seat belt retractor or a seat belt end plate can be mounted to the upper track 12 through the threaded bushing 134.

Although this specification describes the operation of only the outboard adjuster, it is apparent that the inboard adjuster will be simultaneously operated to adjust the seat in horizontal, vertical, or reclining directions. The actuators required to drive gears 62, 120 and 140 may be power or manually driven. The thread 60 is a high lead thread and the jackscrew 50 could therefore be manually retracted by the weight of the occupant when the gear 62 is unlocked. The gear would then be locked after adjustment. The worm 100 may have a thread over only half its exterior and may be manually rotated to disengage this thread from the teeth of member 20 to permit manual horizontal adjustment of the seat.

Thus this invention provides an improved seat adjuster.

The embodiments of the invention in which an exclusive property or privilege is claimed are defined as follows:

1. A seat slide structure for supporting a vehicle occupant seat on a vehicle for adjustment relative thereto comprising, in combination, a pair of elongate relatively movable upper and lower tracks, each track being formed of a pair of complementary opposite hand track members, the track members of the upper track each including a web, a lateral flange and a reversely bent upwardly opening leg, the webs of the track members being secured to each other and the flanges extending oppositely of each other to provide the base wall of the one track, the track members of the lower track each including a web and a reversely bent downwardly opening leg, each leg of each track member including a bight portion and a terminal flange, the legs of the upper track members being interfitted with respective legs of the lower track members to locate the legs in pairs with the bight portions of the legs of the upper track members juxtaposed to the respective terminal flanges of the legs of the lower track member, a generally T-shaped spacer having the leg thereof fitted between and secured to the webs of the lower track members to provide the lower track, the head of the spacer fitting between the base wall of the upper track and the bight portions of the legs of the lower track and normally engaging the juxtaposed bight portions and flanges to block sliding movement of the upper track relative to the spacer and lower track, the head of the spacer including slots located between each bight portion and the base wall, said slots being closed upon movement of the upper track downwardly relative to the lower track upon occupancy of the seat to disengage the engaged bight portions and terminal flanges and permit relative movement of the upper track relative to the spacer and lower track.

2. A seat slide structure for supporting a vehicle occupant seat on a vehicle for adjustment relative thereto comprising, in combination, a pair of elongate relatively movable upper and lower tracks, each track being formed of a pair of complementary opposite hand track members, the track members of the upper track including respective generally vertical webs which are secured to each other, flange portions which provide the base wall of the upper track and legs, the track members of the lower track each including a generally vertical web and a leg, each leg of each upper track member being interefitted with a respective leg of a lower track member to locate the legs in pairs, a spacer having a first portion thereof fitted between and secured to the webs of the lower track members and a second portion thereof fitting between the base wall of the upper track and the lower track for slidably supporting the upper track on the lower track, gear teeth means formed in the second portion of the spacer and facing the base wall of the upper track, and gear means rotatably mounted between the webs of the upper track and meshing with the gear teeth means through the base wall of the upper track to move the upper track relative to the lower track.

3. A seat slide structure for supporting a vehicle occupant seat on a vehicle for adjustment relative thereto comprising, in combination, a pair of elongate relatively movable upper and lower tracks, each track being formed of a pair of complementary opposite hand track members, the track members of the upper track including respective generally vertical webs which are secured to each other, flange portions which provide the base wall of the upper track and legs, the track members of the lower track each including a generally vertical web and a leg interfitted with a respective leg of the upper track member to locate the legs in pairs, a spacer having a first portion thereof fitted between and secured to the webs of the lower track members and a second portion thereof fitting between the base wall of the upper track and the lower track for slidably supporting the upper track on the lower track, gear teeth means formed in the spacer and facing the base wall of the upper track, gear means rotatably mounted between the webs of the upper track members and meshing with the gear means through the base wall of the upper track to move the upper track relative to the lower track, and longitudinally spaced vertically extendable and retractable means housed between the webs of the upper track members for connection to the front and rear portions of the vehicle seat for vertical adjustment thereof.

4. A seat slide structure for supporting a vehicle occupant seat on a vehicle for adjustment relative thereto comprising, in combination, a pair of elongate tracks having spaced pairs of interfitting reversely bent legs, each such leg including a bight portion and a terminal flange, the terminal flange of one leg of each pair being juxtaposed to the bight portion of the other leg of such pair, one track having a base wall interconnecting the legs thereof and juxtaposed to the bight portions of the legs of the other track, slide means between the tracks and including a center portion and a pair of outer integral collapsible portions, each outer portion including a first leg engaging the base wall of one track and a spaced second leg engaging a respective bight portion of the other track, the legs normally spacing the tracks to engage the juxtaposed bight portions and terminal flanges and block relative movement of the tracks, occupancy of the seat collapsing each of the outer portions of the slide means as the legs thereof move relative to each other to disengage the bight portions and terminal flanges and permit relative movement of the tracks and adjustment of the seat.

5. A seat slide structure for supporting a vehicle occupant seat on a vehicle for adjustment relative thereto comprising, in combination, a pair of elongate tracks having spaced pairs of interfitting reversely bent legs, each such leg including a bight portion and a terminal flange, the terminal flange of one leg of each pair being juxtaposed to the bight portion of the other leg of such pair, one track having a base wall interconnecting the legs thereof and juxtaposed to the bight portions of the legs of the other track, slide means between the tracks and including a center portion and a pair of outer integral collapsible portions, each outer portion including a first leg engaging the base wall of one track and a spaced second leg engaging a respective bight portion of the other track, the legs normally spacing the tracks to engage the juxtaposed bight portions and terminal flanges and block relative movement of the tracks, occupancy of the seat collapsing each of the outer portions of the slide means as the legs thereof move relative to each other to disengage the bight portions and terminal flanges and permit relative movement of the tracks and adjustment of the seat,
gear tooth means on the center portion, and
gear means on the one track engaging the gear tooth means to move the tracks relative to each other.

6. A seat slide structure for supporting a vehicle occupant seat on a vehicle for adjustment relative thereto comprising, in combination, a pair of elongate relatively movable upper and lower tracks, each track being formed of a pair of complementary opposite hand track members,
the track members of the upper track each including a web and a reversely bent upwardly opening leg, the webs of the track members being secured to each other,
the track members of the lower track each including a web and a reversely bent downwardly opening leg,
each leg of each track member including a bight portion and a terminal flange, the legs of the upper track members being interfitted with respective legs of the lower track members to locate the legs in pairs with the bight portions of the legs of the upper track members juxtaposed to the respective terminal flanges of the legs of the lower track member,
a generally T-shaped spacer having the leg thereof fitted between and secured to the webs of the lower track members to provide the lower track, the head of the spacer fitting between the upper track and the bight portions of the legs of the lower track to mount the upper track for movement relative to the spacer and lower track, the head of the spacer including a series of gear teeth facing the upper track, and
gear means mounted between the webs of the upper track members and engaging the gear teeth to move the upper track relative to the lower track.

7. A seat slide structure for supporting a vehicle occupant seat on a vehicle for adjustment relative thereto comprising, in combination, a pair of elongate relatively movable upper and lower tracks, each track being formed of a pair of complementary opposite hand track members,
the track members of the upper track each including a web and a leg, the webs of the track members being secured to each other and including a number of paired embossments opening to each other and defining housings,
the track members of the lower track each including a web and a leg,
the legs of the upper and lower track members being arranged in interfitting respective pairs,
a generally T-shaped spacer having the leg thereof fitted between and secured to the webs of the lower track members to provide the lower track, the head of the spacer fitting between the upper track and the legs of the lower track,
gear teeth means on the head of the spacer,
gear means mounted in one of the housings and engaging the gear teeth means to move the upper track relative to the lower track, and
vertical adjustment means mounted in another of the housings for connection to the vehicle occupant seat.

* * * * *